March 25, 1969    D. M. LITTLE    3,434,962
SULFOLANE EXTRACTION OF LIQUID HYDROCARBON STREAMS
Filed March 21, 1966
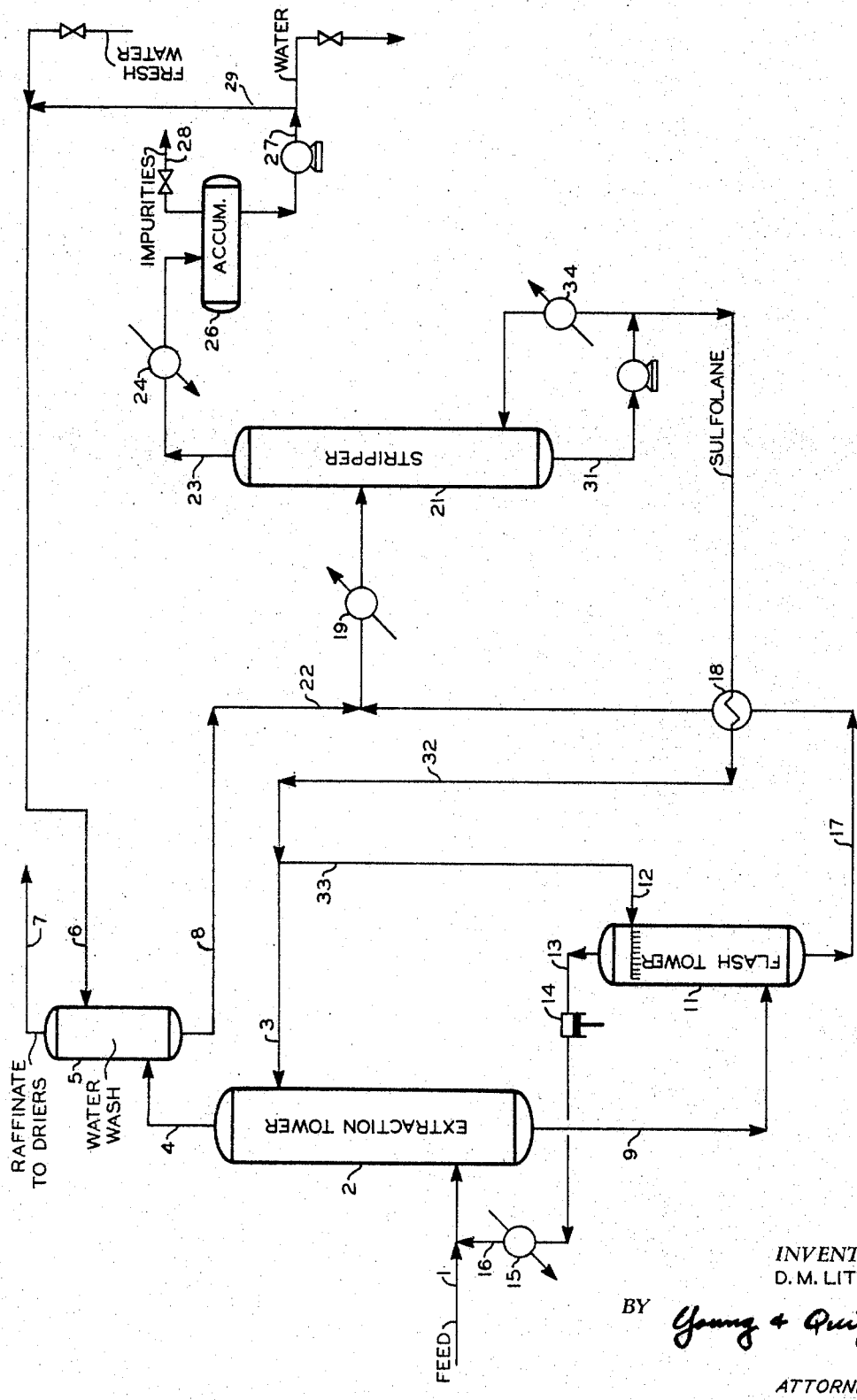
INVENTOR
D. M. LITTLE
BY Young & Quigg
ATTORNEYS

United States Patent Office 3,434,962
Patented Mar. 25, 1969

3,434,962
SULFOLANE EXTRACTION OF LIQUID
HYDROCARBON STREAMS
Donald M. Little, Bartlesville, Okla., assignor to Phillips
Petroleum Company, a corporation of Delaware
Filed Mar. 21, 1966, Ser. No. 536,066
Int. Cl. C10g 29/20, 21/28, 21/22
U.S. Cl. 208—237                                    7 Claims

ABSTRACT OF THE DISCLOSURE

Impurities of higher volatility than the hydrocarbon stream in which they are contained are removed by extraction with sulfolane forming an impurity-free hydrocarbon raffinate containing some sulfolane which can be removed by water-washing and a sulfolane extract containing a minor proportion of hydrocarbon and said impurities, the sulfolane extract phase is flashed forming vapors containing hydrocarbon and impurities, the flashed vapors are washed with fresh sulfolane to remove said impurities, forming a vaporous hydrocarbon stream which can be compressed, condensed, and recycled to said sulfolane extraction and an extract sulfolane impurity-containing stream which can be combined with the water-sulfolane stream and stripped to form separate streams of water, impurities, and sulfolane. The thus recovered streams of water and sulfolane can be recycled for further use.

---

This invention relates to a solvent extraction process for purifying hydrocarbon streams. In one aspect, it relates to a method of removing from a liquid hydrocarbon stream impurities of higher volatility than said hydrocarbon by extracting the stream with sulfolane, submitting the sulfolane extract phase to flashing conditions for the hydrocarbon, and washing the flashed vapors with fresh sulfolane whereby the higher volatility materials are removed from the hydrocarbon. In another aspect, it relates to a method of purifying hydrocarbon streams by contacting them with sulfolane to form a raffinate phase comprising the hydrocarbons with a minor portion of sulfolane, and an extract phase comprising sulfolane, the impurities, and a minor proportion of hydrocarbon; washing the raffinate phase with water to remove the sulfolane therefrom; flashing the extract prase to vaporize the hydrocarbon, washing the flashed vapors with fresh sulfolane, taking the thus washed hydrocarbon and returning it to the feed stream; subjecting the flashed sulfolane and the water containing sulfolane from the hydrocarbon wash to a stripping operation wherein sulfolane is taken out as the bottom product and water and impurities as an overhead product; returning the sulfolane bottom product to the extraction of the liquid hydrocarbon stream, separating the overhead product into a water phase and into an impurities phase; and returning the water to the hydrocarbon wash operation.

It is often necessary to remove various impurities from hydrocarbon streams. Prior to purification, most hydrocarbons contain some amounts of hydrogen sulfide, mercaptans, carbon dioxide, among other impurities. Such impurities are generally considered undesirable for most operations, and are quite detrimental in certain chemical operations such as alkylation, isomerization, catalytic and thermal polymerization, and various other chemical reactions. A great number of proposals have been made for removing these impurities, as for example treatment with caustic soda and subsequent separation and washing. The use of caustic, however, is not entirely satisfactory because of the problems of disposal and the safety hazards which caustic presents. Additionally, it is necessary to take precautions against foaming when using caustic.

It has been proposed that hydrocarbon streams with impurities of the types mentioned above could be purified by extraction with sulfolane. This compound provides an excellent means for separating the impurities mentioned above from like hydrocarbon streams because of its selective solvent power for these impurities. Furthermore, sulfolane is not consumed in use and can be recovered for reuse. There is neither a disposal problem, nor a safety hazard, as in the case with caustic. Furthermore, said sulfolane is non-foaming and rates of flow through the equiment can be increased as compared to the rates of flow used for caustic treatments.

When performing a sulfolane extraction of a light hydrocarbon feed stream, the extract phase will contain the sulfolane, all of the sulfolane-soluble impurities from the feed stream, and a minor proportion of the hydrocarbon stream. Conventionally, this sulfolane extract phase is stripped, and the impurities and the hydrocarbon are removed together from the sulfolane, and the hydrocarbon is thus lost to the process. It has been recognized that the hydrocarbon taken off in this fashion is wasted, and it has been proposed that extractive distillation be used to recover this hydrocarbon. Such extractive distillation appears to be satisfactory when the boiling points of the hydrocarbon and of the impurities are relatively close together. However, when there is a wide differential between the lower boiling impurity and the higher boiling hydrocarbon, extractive distillation is unsatisfactory. Since the impurities start to boil at very low temperatures, any attempt to add sufficient heat to the extract phase to volatilize the hydrocarbons will result in excessive foaming and contamination of the overhead product.

It is thus an object of my invention to provide a method for the recovery of hydrocarbons carried into the extract phase of the sulfolane extraction of a hydrocarbon feed. It is a further object of my invention to provide a method for removing impurities of relatively higher volatility from a liquid hydrocarbon stream. It is a further object of my invention to provide a method for the extraction of impurities from a hydrocarbon stream with subsequent regeneration and reuse of the extractant. It is another object of my invention to purify a liquid hydrocarbon stream for further use in alkylation, isomerization, polymerization, or other chemical processes by extraction with sulfolane.

Other aspects, objects and the several advantages of this invention are apparent to one skilled in the art from a study of this disclosure, drawing, and the appended claims.

According to my invention, a liquid hydrocarbon stream containing impurities of higher volatility than the hydrocarbon is purified by extracting with sulfolane to form a raffinate phase comprising the hydrocarbons and a minor proportion of sulfolane, and an extract phase comprising sulfolane, impurities, and a minor proportion of the hydrocarbon; washing the raffinate phase with water to extract the sulfolane from the hydrocarbons; flashing the extract under conditions such that the entire volatile portion of the extract phase will vaporize; washing the vapors thus formed with fresh liquid sulfolane to absorb the impurities from the vapors; removing the hydrocarbons from the flash chamber as a gas, liquifying the gaseous hydrocarbons, and returning them to the feed stream; stripping the flashed sulfolane containing the impurities and the water containing sulfolane from the raffinate wash treatment to form a bottom product comprising substantially pure sulfolane; returning this regenerated sulfolane to the hydrocarbon extraction step; separating the overhead from the stripping operation to form a water phase and an impurity phase; and returning the water phase to the raffinate wash step.

It will be seen that the process of my invention is applicable to any feed stream which is substantially insoluble in sulfolane. In my preferred embodiment, I treat lower olefins and paraffins which are subsequently to be used for alkylation, isomerization, or polymerization. Hydrocarbons having from 2 to 8 carbon atoms are particularly suitable for use in the process of my invention.

The process of my invention can be seen from the attached drawing. This flow sheet shows an embodiment of my invention suitable for treatment of a feed stream of mixed hydrocarbons preparatory to alkylation.

Hydrocarbon feed containing volatile impurities is introduced through line 1 to extraction tower 2 where it is extracted with sulfolane introduced through line 3. The raffinate phase, comprising the hydrocarbon with a small amount of sulfolane, is taken through line 4 to wash tower 5. In this tower it is washed with water introduced through line 6 which extracts the sulfolane from the hydrocarbon. The hydrocarbon, now free of sulfolane but saturated with water, is removed through line 7 and taken to a drying unit of any type known to the art. The wash water containing sulfolane is removed from the bottom of wash tower 5 through line 8 for further processing as will be described below.

The extract phase from extraction tower 2, comprising sulfolane, the volatile impurities, and the small amount of hydrocarbon, is removed from the bottom of the extraction tower through line 9. This extract phase is introduced to a hydrocarbon flash tower 11 which is operated under such conditions of temperature and pressure that the entire volatile portion of the extract phase, consisting of both the impurities and the hydrocarbon, will vaporize. The extract phase will be introduced to the flash tower in finely divided condition to aid in the flashing of these volatile constituents. The vapors rising from this flash tower operation are washed with a spray of fresh sulfolane introduced through line 12. This sulfolane wash will absorb the impurities and carry them downward to the bottom of the tower, allowing vaporous hydrocarbon to pass overhead from the tower through line 13. This vaporous hydrocarbon stream is liquified by the action of compressor 14 and cooler 15 so that it can be returned to the hydrocarbon feed stream through line 16. All of the hydrocarbon which was entrapped in the extract phase with the sulfolane is therefore recycled to the feed. Since the hydrocarbon which is recycled by this means represents the equilibrium quantity of the hydrocarbon dissolved in the sulfolane extract phase, there will be no loss whatever of hydrocarbon once equilibrium of the process has been established, and all of the hydrocarbon introduced through line 1 will then be recovered as purified hydrocarbon through line 7.

The bottom product of hydrocarbon flash tower 11 comprises sulfolane and the volatile impurities present in the original feed stream. This stream is taken through line 17, passes in heat exchange relationship with the return sulfolane stream in heat exchanger 18, is further heated in heater 19, and taken into sulfolane stripper 21. The water-sulfolane stream from water wash tower 5 is also taken to sulfolane stripper 21 through lines 8, 22, and heater 19. Sulfolane stripper 21 is operated under such conditions to distill all of the impurities and the water present overhead through line 23. This stream is cooled in cooler 24, and separated in separator 26 to form a water phase taken out through line 27, and an impurity phase, usually gaseous, taken through line 28. The water in line 27 is returned through lines 29 and 6 for further utility in washing of the hydrocarbon from the original extraction. Stripped sulfolane is removed through line 31, heat exchanged with the feed to the sulfolane stripper in heat exchanger 18, and returned for further extraction through lines 32 and 3. A portion of this stripped sulfolane is taken through line 33 to be used as the spray in hydrocarbon flash tower 11. Heat for sulfolane stripper 21 can be supplied by diverting a portion of stripped sulfolane through heater 34, and returning it to stripper 21.

Example

The following example illustrates the process as described above for treating a feed stream comprising butylenes and normal butane, and containing as impurities $H_2S$, mercaptans, carbonyl sulfide, and carbon dioxide. The temperature and pressure conditions at each stage of the process are shown in Table I.

TABLE I

|  | Temperature (° F.) | Pressure (p.s.i.g.) |
| --- | --- | --- |
| Extraction tower | 100 | 105 |
| Flash tower | 85 | 25 |
| Water wash tower | 100 | 100 |
| Sulfolane stripper | 275 | 15 |

The mol ratio of sulfolane to hydrocarbon feed used in the extraction tower is 2 to 1. The mol ratio of sulfolane to the feed used in the flash tower is 2 to 1. The volume ratio of the water to the feed used in the wash tower is 1 to 1.

The feed charged to the process is 100 barrels per hour. Table II shows the analysis of the feed stream entering extraction tower, the raffinate removed from the water wash tower, and the vapor removed overhead from the sulfolane stripper.

TABLE II

|  | Feed to extraction tower (p.p.m.) | Raffinate from water wash tower (bbl./hr.) | Vapor from sulfolane stripper (parts) |
| --- | --- | --- | --- |
| Butylenes | ¹ 40 | 40 |  |
| Normal Butane | ¹ 60 | 60 |  |
| $H_2S$ | 100 | Trace | 50 |
| Mercaptans | 40 | Trace | 20 |
| Carbonyl sulfide | 20 | Trace | 10 |
| Carbon dioxide | 20 | Trace | 10 |
| Water |  | Saturated | 10 |

¹ Bbl./hr.

It is thus seen that the process of my invention provides an efficient and economical method for the removal of sulfolane-soluble impurities from a sulfolane-insoluble stream.

Reasonable variation and modification are possible within the scope of the foregoing disclosure, the drawing and the appended claims to the invention, the essence of which is that a hydrocarbon stream is treated for removal of impurities of higher volatility than the hydrocarbon by extracting the stream with sulfolane to form a raffinate phase comprising the hydrocarbons and a minor proportion of sulflane, and an extract phase containing sulfolane, the impurities and a minor proportion of the hydrocarbon; flashing the extract phase to vaporize the hydrocarbon and the impurities; and contacting the flashed vapors with fresh liquid sulfolane to reabsorb the impurities in the liquid sulfolane from the gaseous hydrocarbon.

I claim:

1. Process of removing from a liquid hydrocarbon stream impurities of higher volatility than said hydrocarbon comprising extracting said stream with sulfolane to form a raffinate phase comprising said hydrocarbons and a minor proportion of sulfolane and an extract phase comprising sulfolane, said impurities and a minor proportion of said hydrocarbon; flashing said extract phase to vaporize said hydrocarbon and said impurities; contacting the flashed vapors with liquid sulfolane whereby said higher volatility impurities in said flashed vapors are absorbed by said liquid sulfolane, and the said minor proportion of hydrocarbon is removed from the contacting as a gas.

2. Process of claim 1 wherein said minor proportion of hydrocarbon is liquified and returned to said hydrocarbon stream.

3. Process of claim 1 wherein said minor proportion of sulfolane is extracted from the hydrocarbon in said raffinate phase with water.

4. Process of claim 3 wherein said water containing said minor proportion of sulfolane and said liquid sulfolane containing said higher volatility impurities are stripped to form overhead product comprising said impurities and said water, and a bottom product comprising sulfolane.

5. Process of claim 4 wherein water is separated from the impurities in said overhead product and is recycled for further extraction of sulfolane from said raffinate phase; and the said bottom product comprising sulfolane is recycled for further extraction of said liquid hydrocarbon stream.

6. Process of claim 1 wherein said hydrocarbon stream comprises butane and butylenes.

7. The process of claim 6 wherein said impurities comprise hydrogen sulfide, mercaptans, carbonyl sulfide, and carbon dioxide.

References Cited

UNITED STATES PATENTS 2,645,596  7/1953  Axe _____ 208—32

FOREIGN PATENTS 448,898  6/1948  Canada.

DELBERT E. GANTZ, *Primary Examiner.*

J. D. MYERS, *Assistant Examiner.*